United States Patent [19]

Lorenzini

[11] Patent Number: 4,896,611
[45] Date of Patent: Jan. 30, 1990

[54] DRINK HOLDER FOR AUTOMOTIVE MINI-VANS

[76] Inventor: James W. Lorenzini, 6497 E. Via Algardi, Tucson, Ariz. 85715

[21] Appl. No.: 266,874

[22] Filed: Nov. 3, 1988

[51] Int. Cl.$^4$ .............................................. A47B 23/00
[52] U.S. Cl. ........................................ 108/45; 108/25
[58] Field of Search .................... 108/45, 44, 46, 25, 108/108, 26; 297/194, 188, 192; 248/231.3, 231.9; 224/42.45 R, 273

[56] References Cited

U.S. PATENT DOCUMENTS

| | | | |
|---|---|---|---|
| D. 197,729 | 3/1964 | Beychok | 108/44 X |
| 2,037,394 | 6/1958 | Rahall | 108/25 |
| 2,546,459 | 3/1951 | Lee . | |
| 2,829,779 | 4/1958 | Weddington . | |
| 3,052,362 | 9/1962 | Bischoff | 248/231.9 X |
| 3,190,241 | 6/1964 | Rodgers et al. | 108/45 |
| 3,201,072 | 8/1965 | DuBois . | |
| 3,233,744 | 2/1966 | Ripps | 108/26 X |
| 3,249,070 | 5/1966 | Day et al. | 108/26 |
| 3,662,982 | 5/1972 | Antonius | 108/45 X |
| 3,690,724 | 9/1972 | Douglas et al. | 108/44 X |
| 4,444,124 | 4/1984 | Burr | 248/439 X |
| 4,643,342 | 2/1987 | Borelli, III | 224/148 X |
| 4,724,986 | 2/1988 | Kahn . | |

Primary Examiner—Kenneth J. Dorner
Assistant Examiner—José V. Chen
Attorney, Agent, or Firm—J. Michael McClanahan

[57] ABSTRACT

A drink holder for mini-vans is detailed and described which does not require a fixed physical attachment to a mini-van, the drink holder having a flat surface tray with a plurality of openings therethrough adapted to receive various sized drink containers or soft drink cans, and a coffee cup, together with a rectangular shaped receptacle providing a cavity below the surface of the top, the cavity for receiving small food or non-food items. Attached to the bottom surface of the top are a pair of "J" shaped legs, the elongated portion of the legs adapted to be frictionally secured interiorly to a compartment provided in the mini-van front console and dashboard assembly and thereby to secure the tray in a fixed level portion. The legs are each hinged to the bottom surface of the tray to swing in towards the tray for minimum storage room and protection against breakage of the legs during non-use. A cross member is forcibly urged against each leg to hold the legs perpendicularly outward of the tray, the cross member secured in a notch formed in the legs proximate the hinge. The cross member, in addition, provides a lower bottom support for a cup held in one of the plurality of the openings.

13 Claims, 1 Drawing Sheet

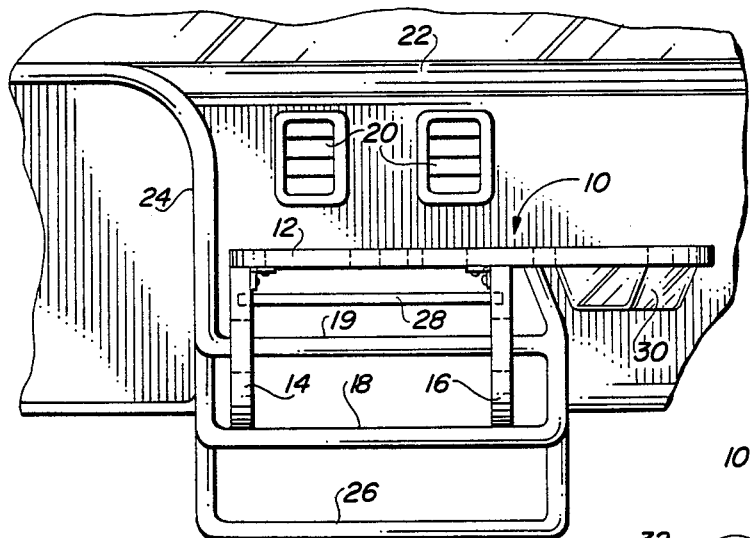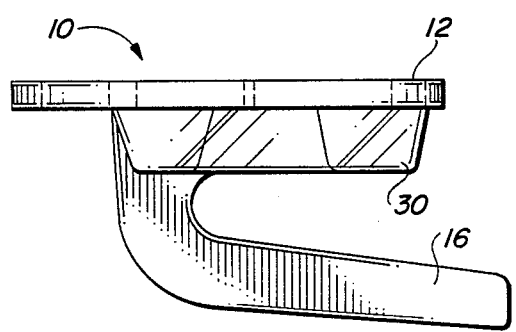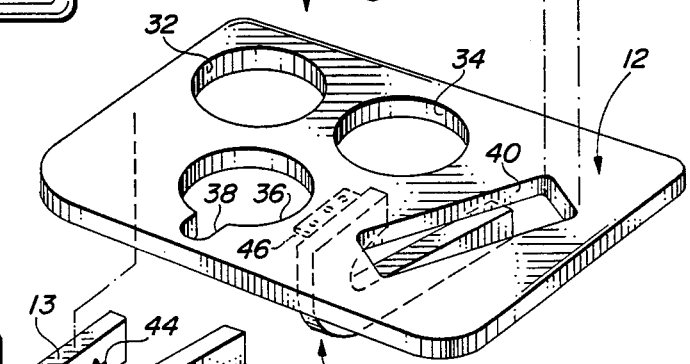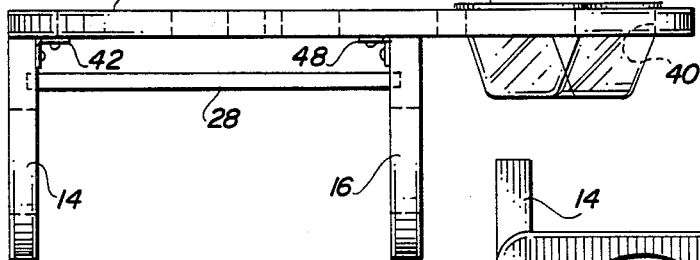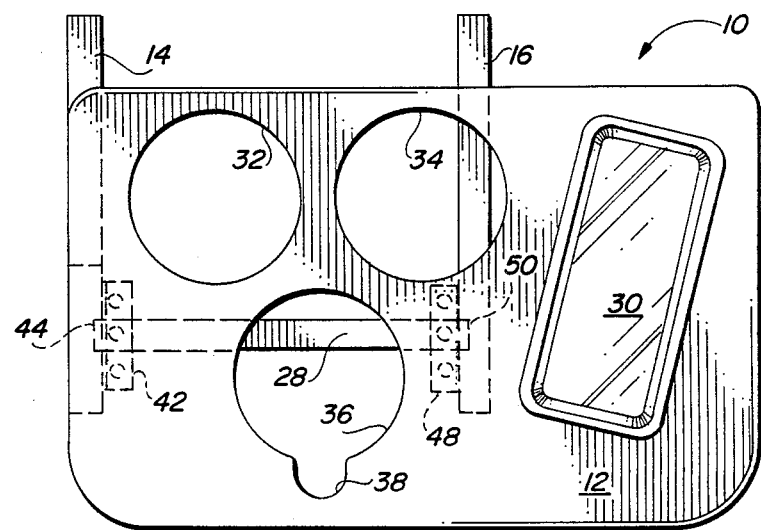

DRINK HOLDER FOR AUTOMOTIVE MINI-VANS

BACKGROUND OF THE INVENTION

1. Field of the Invention

The field of the invention is devices adapted to be secured to the front console and dashboard of automobiles and other motor vehicles to secure for the convenience of the driver and passengers, drink containers, coffee cups, and other small food and non-food items.

2. Description of Related Art

Motorists have long enjoyed the convenience of having coffee, soft drinks, small packaged food items, and the like with them while traveling in their motor vehicles. However, manufacturers of motor vehicles, although perhaps recognizing the desire for such conveniences, have not been particularly adept in providing trays or other receptacles for securing the cups, soft drink cans, or other small food items. Some attempts have been made by automotive manufacturers to provide horizontal surfaces to rest soft drink containers on, sometimes with a pair or so of shallow, hollowed out, disk shaped indentations on the dashboard or front console of the motor vehicle, however, such efforts to secure the drink containers against tipping have been notably unsuccessful. In addition, some manufacturers of motor vehicles have placed disk shaped indentations on the inside of the glove compartment door to receive drink containers, however, like the attempts made in the central portion of the console, the circular indentations will not secure a drink container against spilling its contents or tipping over during the various movements that the motor vehicle normally goes through.

Now there have been various devices known to the Inventor for securing drink containers, coffee cups, and small food and non-food items which have apparently served their stated purpose. For example, Lee, in U.S. Pat. No. 2,546,459, discloses an automobile tray secured to automotive instrument panels which pulls out from underneath the dashboard and permits the securing of drink containers and also provides a flat surface to support other small items. Similarly, Weddington, in U.S. Pat. No. 2,829,779, also discloses a service tray for automobile instrument panels which is secured to the automobile instrument panel for holding small articles and containers of liquid and the like against spillage or movement.

Other receptacles and holders have been devised for securing liquid filled containers, such as the device shown by DuBois in U.S. Pat. No. 3,201,072, for an under-the-dashboard container which slides out for use, providing both a shallow tray to receive various items and a rather deep container to hold soft drink cans and the like. Lastly, Kahn, in U.S. Pat. No. 4,724,986, discloses a beverage receptacle holder which is secured to the interior of the passenger vehicle dashboard and provides a receptacle for receiving coffee cups and soft drink cans.

While all the above inventions describe suitable receptacles to secure cups and beverage cans, as well as small non-food items, yet they all require installation brackets and other securing means for attachment to the motor vehicle dashboard and front console, requiring, in many cases, the drilling of holes and the screwing of sheet metal screws into the motor vehicle console and dashboard. Consequently, if the drink receptacle and holder is removed, unsightly scarring and damage is left on the dashboard and front console.

It is far better that a drink holder and other small item receptacle for conveniently providing ready accessibility to coffee cups, soft drink cans, and small food and non-food items adapt to the front console and dashboard assembly provided by the motor vehicle manufacturer and be secured in place without having to modify the front console and dashboard assembly with the attachment of structural pieces requiring drilling of holes to receive sheet metal screws or other various similar methods of attachment, all resulting in the scarring of the front console and dashboard assembly.

Accordingly, it would be useful to have a drink holder and small items receptacle for motor vehicles which provides a stable platform to receive and secure soft drink cans and other containers, but which utilizes compartments and other conveniences that the motor vehicle manufacturers have built into their front console and dashboard assemblies as a means to secure the drink holder to the vehicle.

SUMMARY OF THE INVENTION

This invention relates to a drink holder for motor vehicles and particularly for mini-vans adapted to receive and secure drink containers, coffee cups, and small food items, but does not require fixed mounts for installation which might leave scars after removal.

More specifically, the invention consist of a tray having a flat top with a plurality of drink container receiving openings therethrough, preferably two side by side openings in the rear portion of the tray which are adapted to receive beverage containers of a size up to the relatively large containers currently sold, such as containers containing 44 ounces of soft drink. A third opening forward of the two side by side openings, and spaced equally between the two openings is an opening adapted to receive a smaller drink container, such as a coffee cup, which opening is appended by an additional partial moon shaped opening projection to receive the coffee cup handle. On one side of the drink holder tray is a rectangular shaped receptacle or cavity resembling the top half of an inverted butter container which protrudes downward through a rectangular shaped opening formed in the tray and which is secured in that opening. The rectangular shaped receptacle receives small food and non-food items into its cavity for securing against movement of the motor vehicle which might tend to scatter an otherwise unsecured item.

Attached to the under surface of the tray at right angles are a pair of specially shaped legs, the legs forming a "J" shaped structure with the elongated projection adapted to be secured internally to a compartment formed in the front console and dashboard assembly by the manufacturer of the mini-van. The elongated portion of the legs engage the top and the bottom surface of the compartment in the van in a frictionally tight manner such as to be fixedly held in place and thereby secure the drink holder. The short projection of the "J" legs opposite the elongated projection attaches by hinge means to the underside of the tray in order that to minimize storage space and facilitate compactness, and to reduce opportunity for breaking the legs when the device is not in use, the legs swing to a position where one leg is laying against the underside of the drink holder tray and the other leg then lies next to the first laid down leg.

Lastly, a cross member engages a notch formed in the inside portion of each leg proximate each leg's hinged attachment to the underside of the drink holder tray, the cross member serving to retain the legs in their outstanding perpendicular position and to provide a base support for a cup placed into the coffee cup opening of the top in order that the cup would not fall through the coffee cup opening.

It is an object of the subject invention to provide a drink holder for motor vehicles adapted to secure a plurality of drink containers and also small food or non-food items.

It is another object of the subject invention to provide a drink holder for mini-vans to secure a plurality of drink containers and small items wherein the drink holder is secured to the mini-van front console and dashboard assembly utilizing compartments and other conveniences provided in the dashboard and console assembly.

It is still another object of the subject invention to provide a drink holder for mini-vans having a pair of legs adapted to be secured interiorly to a compartment provided in a mini-van dashboard and console assembly.

Other objects and a fuller understanding of the invention may be had by referring to the description and claims which follow, taken in conjunction with the accompanying drawings which illustrate preferred embodiments thereof, it being understood that the invention accordingly comprises the apparatus comprising the construction, combination of elements, and arrangement of parts which are exemplified in the following detailed disclosure and the scope of the invention which will be indicated in the claims.

BRIEF DESCRIPTION OF THE DRAWINGS

For further understanding of the nature and objects of the subject invention, reference should be had to the following detailed description taken in connection with the accompanying drawings wherein:

FIG. 1 is a front view of the subject invention in the mini-van front console and dashboard assembly;

FIG. 2 is a perspective view of the subject invention showing it also in a partially exploded view;

FIG. 3 is a top view of the subject invention;

FIG. 4 is a side view of the subject invention; and

FIG. 5 is a front view of the subject invention.

In various views, like index numbers refer to like elements.

DETAILED DESCRIPTION OF THE PREFERRED EMBODIMENT

Referring now to FIG. 1, a front view of the inventive drink holder 10 installed in the front console and dashboard assembly of a mini-van motor vehicle is shown. As will be detailed in the following description, no fixed mounting is required to secure the drink holder in place. Seen in FIG. 1, the flat top tray 12 of drink holder 10 with its two legs namely left leg 14 and right leg 16 attached to the flat bottom surface of tray 12, are so shaped to enter compartment 18 of the front console and dashboard assembly and to engage the top and bottom interior walls of compartment 18 in a tight frictional manner. Compartment 18 is part of the front console and dashboard assembly molded by the mini-van manufacturer. Nominally it is utilized to hold magazines or maps for the driver's convenience. Shown immediately above tray 12 of drink holder 10 are the two air conditioning vents 20, and upper dashboard 22, both of which are part of the front console and dashboard assembly. Immediately to the left of the console wall 24 of the front console and dashboard assembly of the motor vehicle is located, (but not shown), the various meters and indicators, such as speedometer, electrical meters, and the like, including the steering wheel. All these parts of the motor vehicle are well known and for simplicity have been left out of the drawing. Immediately below compartment 18 of the motor vehicle is a second compartment 26 which is also part of the front console and dashboard assembly, but which is not utilized by the subject invention. Compartment 26 is normally utilized to hold the radio for the vehicle.

As seen in FIG. 1, drink holder 10 is characterized by its two legs 14 and 16 extending down below tray 12, and held to the bottom flat surface of tray 12 by a pair of hinges which allow the legs to collapse inward towards each other with the result of one leg laying parallel and proximate the lower surface of tray 12 and the other leg lying at an angle upon the first leg. Holding the legs apart in a rigid configuration at right angles to the tray 12 bottom surface is structural cross bar 28 which is a thin piece of wood adapted to enter for securing a notch which has been placed on the inside portion of each leg. On the right hand portion of tray 12 is a plastic container 30 which is fitted through a rectangular shaped opening in the top flat surface of the tray to provide an opportunity to hold various items in addition to the primary purpose of securing drink containers.

Further shown in FIG. 1 is surface 19, the top outside surface of compartment 18 formed in the front console and dashboard assembly. Surface 19 recedes from protruding compartment 18 to the point where it joins generally the vertical surface of the front console and dashboard assembly which rises up to contain the air conditioning vents 20. Flat surface 19 serves to provide a bottom rest for soft drink containers or cans which are placed in the back two openings (shown in FIGS. 2 and 3). However, many soft drink container have sloping sides which engage the walls of the rear openings and will have no need of the bottom rest surface 19.

Referring now to FIG. 2, a perspective view of the subject invention is shown with the left leg 14 which, for clarity, has been exploded away from its position immediately attached to the under surface of tray 12. Shown in FIG. 2 are the multiple drink container openings, here showing a total of three, firstly openings 32 and 34 ideally situated to receive varying sizes of large drink containers that are so popular today. The openings 32 and 34 are designed to receive the associated drink containers, or for that matter, a drink contained in a metal or plastic can, and to limit horizontal movement of the drink container or can. The base of the drink container or can rests upon the top surface 19 of compartment 18 if the can diameter is less than the opening. In the preferred embodiment, top surface 19 generally resides two to four inches below tray 12 (FIG. 1). A third drink container opening 36, nominally to receive a coffee cup or the like, is situated generally forward of the two rear drink container openings 32 and 34, and, for convenience, generally aligned equal distance between their centers. Coffee cup opening 36, generally circular as are drink container openings 32 and 34, is further characterized by an appended partial moon cut 38 at the circular periphery adapted to receive the handle portion of a cup.

As can be seen in FIG. 1 and FIGS. 3-5, cross bar 28 is situated a short distance below coffee cup opening 36 where it provides a resting place for the base of a coffee cup located in the opening. As seen in FIG. 2, tray 12 has generally a flat top surface with a thickness between a flat bottom surface, the thickness of tray 12 in the preferred embodiment being in the order of ¾ inch. On the right hand portion of top 12 is rectangular opening 40 through which is situated plastic container 30, plastic container 30 generally having a lip at its upper surface which rests upon the are of tray 12 immediately surrounding the rectangular opening 40. Plastic container 30 in the preferred embodiment is comprised the top part of a butter container, which when inverted and inserted into opening 40, drops to a depth of about 1¼ inches or so below the bottom surface of tray 12.

In FIG. 2, legs 14 and 16 are identical in construction except for notches 44 and 50 respectively cut into each leg to receive cross bar 28, the notches situated on the inside of each leg. Each leg forms a "J" shaped structure with the short portion of the "J" opposite its elongated leg adopted to be situated juxtaposed to the bottom surface of tray 12, held there by means of hinge 42 seen in FIG. 2. Small wood screws hold hinge 42 to leg 14 and to the bottom surface of tray 12. Situated immediately below the position of hinge 42 on leg 14 is notch 44 earlier described receiving one end of cross bar 28. Leg 16, shown predominately in dotted form in FIG. 2, attaches like opposite leg 14 to the underside of tray 12, situated and fixed to tray 12 by right hinge 46. It too, like left hinge 42, is attached to leg 16 and to tray 12 by means of a short wood screws (not shown).

Legs 14 and 16 shown in FIG. 2 are so shaped as to forcibly enter compartment 18 shown in FIG. 1 and to frictionally be held in compartment 18 by engagement of the top and bottom interior surfaces. Further, the elongated portions of left leg 14 and right leg 16 are of such a length as to approach the inside bottom end of compartment 18, but not to engage it. Sufficient friction is generated between the top and the bottom edge surfaces of the elongated leg portion and the inside of compartment 18 to hold the legs fast. The elongated portion of the legs are sloped at a slight downward angle relative to tray 12 to conform to the slightly downward slope of compartment 18. This way, the tray remains horizontal.

Referring now to FIG. 3, a top view of the subject inventive drink holder 10 is shown comprising, from left to right, left leg 14 with its associated left notch 44, and left hinge 42 attaching leg 14 to tray 12. It is noted that the left hand side of tray 12 has been slightly indented for about 60% of the length of the side. The reason for this was the particular construction of the mini-van where wall 24 of the front console and dashboard assembly (shown in FIG. 1) is tightly engaged by the left side of tray 12. This does not, however, serve as a support mechanism. Such construction may not be necessary on all models and years of mini-vans.

Continuing, the two drink container openings 32 and 34 are next shown to the rear or upper portion of tray 12 with coffee cup opening 36 to the front of openings 32 and 34. Partial moon shaped cup opening 38 is shown connecting with the circular opening of coffee cup opening 36. Seen immediately below coffee cup opening 36 is cross bar 38 which crosses from side to side between the legs and which performs the dual function of providing a bottom rest for a coffee cup and of holding the legs rigidly outward at a 90-degree angle with the bottom surface of tray 12. Proceeding rightward, right leg 16 is shown in both dotted and full section, right leg 16 also attached to tray 12 by means of right hinge 48 with the associated wood screws. Right notch 50 is shown in right leg 16, right notch 50 adapted to receive the other end of cross bar 28. Lastly, plastic container 30 is shown situated in rectangular opening formed through the top 12.

FIG. 4 is a side view of the inventive drink holder 10 showing most predominantly tray 12, plastic container 30, and right leg 16. As seen in FIG. 4, the bottom edge of the elongated portion of leg 16 is not parallel to the top surface of tray 12 but in fact has been angled to conform to the slightly angled compartment 18 of the motor vehicle front console and dashboard assembly. It is obvious that different makes and different models of motor vehicles, including mini-vans, will have compartments of different sizes and shapes and extending inwardly at different angles. Obviously, legs 14 and 16 are then constructed to conform to the shape of the compartment, specifically the distance between opposite interior sides, and the angle, if any, which the compartment takes with respect to the horizontal in order that the top of tray 12 should be horizontal. In the preferred embodiment, and as can be seen from FIG. 4, the major elongated portion of the legs tend to decrease slightly in width a the most end of the leg is approached. This conforms generally with the interior height of the compartment of the mini-van to which the invention was fitted.

Lastly detailed in FIG. 5 is a front view of the subject drink holder 10 detailing the elements shown in FIGS. 1 and 2 namely, left leg 14, right leg 16, cross bar 28, the respective left and right hinges 42 and 48, and tray 12. On the right hand portion of the drawing shown in FIG. 5 is the plastic container 30 situated with its opening approximately at the top surface of tray 12 and protruding downward through rectangular opening 40 to extend a short distance below the bottom surface of tray 12.

It is realized of course that many variations of the arrangement of openings in top 12 may be accomplished and other features in addition to plastic container 30 may also be situated in the top Particular design of the left and right legs 14 and 16 respectively to take the shape of the particular compartment of various different mini-vans such as to be frictionally held within that compartment, and thus holding the inventive drink container tray horizontally in place are all within the state of the art and require engineering skill also within the state of the art.

Accordingly, it is obvious that the subject invention may be adopted to any manufacturer's motor vehicle, in addition to mini-vans, which provide a compartment in the front console and dashboard assembly able to receive the legs shown in the invention (with obvious modifications) in a frictional holding relationship. In the preferred embodiment, all pieces were constructed of wood except the receptacle 30, which was made of plastic, and the hinges and their associated wood screws, which were made of metal. The invention was completed with an appropriate finish, such as varnish. Just as obvious, the invention may be constructed from other materials, such as plastics or metal. It is also obvious that any number of openings to receive drink containers, or any number of receptacles, such as plastic container 30, may be utilized in the device.

While a preferred embodiment has been shown and described, it will be understood that there is no intent to limit the invention by such disclosure, but rather it is intended to cover all modifications and alternate constructions falling within the spirit and the scope of the invention as defined in the appended claims.

I claim:

1. A removable drink holder for installation in a motor vehicle utilizing for installation a compartment having an interior provided in the front console and dashboard assembly of the motor vehicle, and not requiring fixed physical attachment to the motor vehicle, the drink holder comprising:

a tray with a plurality of openings therethrough adapted to receive various sized drink containers, said tray having a top flat surface and a bottom flat surface; and a pair of legs operably attached to said tray, said legs having means to frictionally engage a compartment interior provided in the front console and dashboard assembly of the motor vehicle, said legs having an elongated portion and an oppositely situated short portion, said short portion mounted to the bottom flat surface, said elongated portion shape defined by a width and length, which conforms to the compartment interior, said width decreasing relative to said length, said shape defining said means to frictionally engage interiorly the compartment provided in the motor vehicle front console and dashboard assembly whereby the tray is held in a fixed position in the motor vehicle for the convenience of the driver and passengers.

2. The drink holder as defined in claim 1 wherein said legs elongated portion and oppositely situated short portion form a "J", said short portion hinged and parallel to the bottom flat surface of said tray, and each said leg short portion and elongated portion in the same plane, said legs adapted to be positioned perpendicular to said tray when in use, and swung inward towards said tray bottom flat surface when not being used.

3. The drink holder as defined in claim 2 further including a structural cross member having two ends, said cross member forcibly urged against each leg to hold the legs perpendicularly outward of the tray bottom surface.

4. The drink holder as defined in claim 3 wherein each leg further includes a notch, said notch adapted to receive one end of said structural cross member.

5. The drink holder as defined in claim 3 wherein said tray contains at least three circular openings therethrough adapted to receive various sized drink containers.

6. The drink holder as defined in claim 5 wherein said structural cross member is proximate at least one of said plurality of openings, said structural cross member providing as a base to receive a drink container situated in said one of said plurality of openings.

7. The drink holder as defined in claim 6 wherein said one of said plurality of circular openings has appended to it a partial moon-cut opening, said partial moon-cut opening adapted to receive an associated drink container whereby a drink container such as a coffee cup with a handle may be held in said opening with the handle situated in said half-moon appended portion.

8. The drink holder as defined in claim 7 wherein said tray further includes a rectangular opening therethrough, and said drink holder further includes a rectangular shaped receptacle, said rectangular shaped receptacle adapted to be emplaced in said rectangular shaped opening in order to provide a cavity to receive small food or non-food items.

9. The drink holder as defined in claim 2 wherein said elongated portion of said legs is at an angle to said short portion of said legs.

10. The drink holder as defined in claim 9 wherein said tray top and bottom flat surfaces are parallel, and said short portion of said legs is parallel to said tray top and bottom flat surfaces.

11. A removable drink holder for installation in a motor vehicle utilizing for installation a compartment having an interior provided in the front console and dashboard assembly of the motor vehicle, and not requiring fixed physical attachment to the motor vehicle, the drink holder comprising:

a tray with a plurality of openings therethrough adapted to receive various sized drink containers, said tray having a top flat surface and a bottom flat surface; and a pair of legs operably attached to said tray, said legs having means to frictionally engage a compartment interior provided in the front console and dashboard assembly of the motor vehicle, said legs having an elongated portion and an oppositely situated short portion said short portion mounted to the bottom flat surface, said elongated portion having a shape defined by width and length, said legs elongated portion width having a relationship with respect to said length which conforms generally to the compartment interior provided in the front console and dashboard assembly of the motor vehicle, said shape defining said means to frictionally engage interiorly the compartment provided in the front console and dashboard assembly whereby the tray is held in a fixed position in the motor vehicle for the convenience of the driver and passengers.

12. The removable drink holder as defined in claim 11 wherein said short portion of said legs are hinged to the bottom flat surface of said tray, and further including a structural cross member having two ends, said cross member forcibly urged against each said leg to hold said legs perpendicularly outward of the tray bottom surface.

13. In combination, a drink holder for a motor vehicle and a motor vehicle front console compartment, the combination comprising:

a tray with a plurality of openings therethrough adapted to receive various sized drink containers, said tray having a top flat surface and a bottom flat surface;

a pair of legs operably attached to the bottom flat surface of said tray, said legs having an elongated portion and an oppositely situated short portion, said short portion hingedly mounted and parallel to said tray bottom flat surface, said elongated portion having a width and a length; and a motor vehicle front console compartment, said compartment having an interior receiving said pair of legs, said interior having a depth and a height, said compartment interior depth conforming generally to said legs elongated portion length and said compartment interior height conforming generally to said legs elongated portion width, said legs frictionally secured in said compartment interior whereby the legs are held secured in a fixed position and thereby the tray for the convenience of the drivers and passengers.

* * * * *